Dec. 17, 1935.  B. J. UKROPINA  2,024,488
CONCRETE PIPE JOINT
Original Filed Nov. 20, 1933
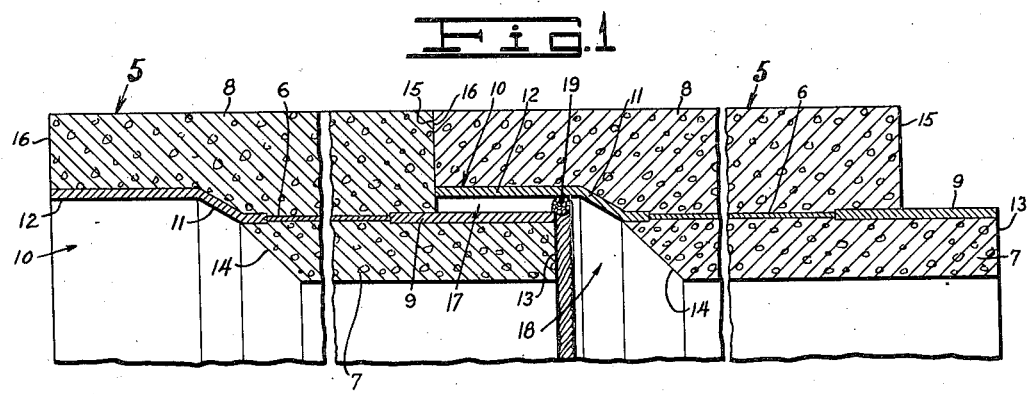
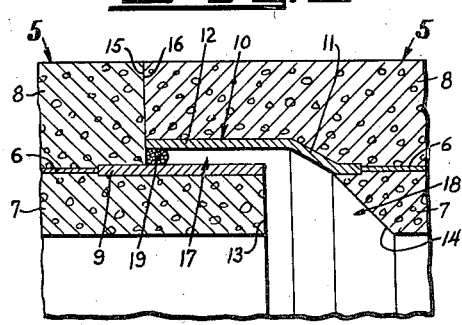
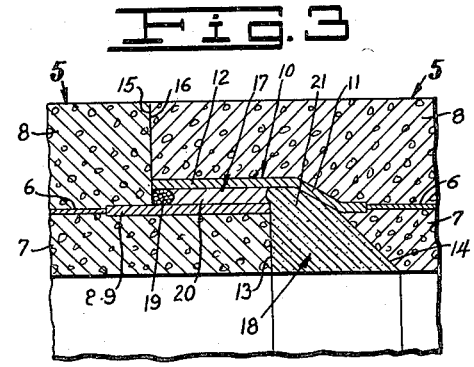
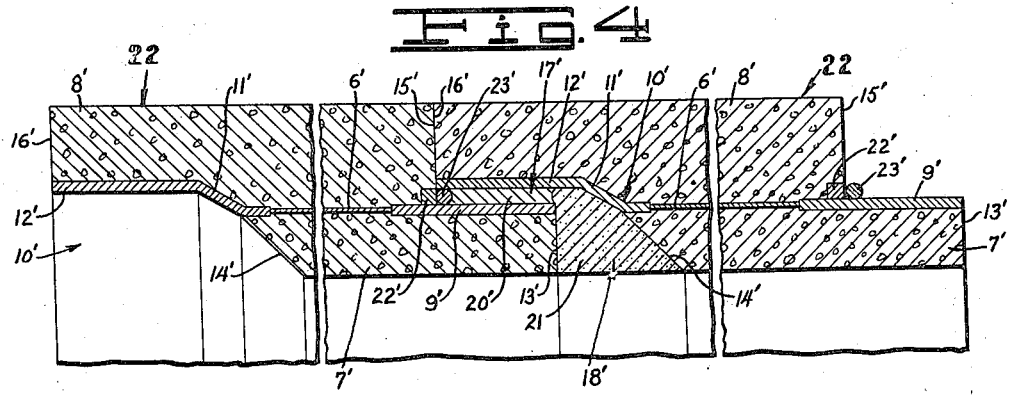
INVENTOR.
*B.J. UKROPINA.*
BY
ATTORNEY.

Patented Dec. 17, 1935

2,024,488

UNITED STATES PATENT OFFICE 2,024,488

CONCRETE PIPE JOINT

Bozidar J. Ukropina, Los Angeles, Calif.

Original application November 20, 1933, Serial No. 698,814. Divided and this application July 13, 1934, Serial No. 734,952

2 Claims. (Cl. 285—112)

This invention relates to improvements in concrete pipes and joints therefor.

The general object of the invention is to provide an improved concrete pipe construction.

Another object of the invention is to provide an improved joint construction for joining two lengths of pipe.

A more specific object of my invention is to provide a concrete joint wherein the spigot end includes a bevelled centering member.

Other objects and the advantages of this invention will be apparent from the following description taken in connection with the accompanying drawing wherein:

Fig. 1 is a fragmentary longitudinal section through a modified form of pipe showing one step in the forming of a joint;

Fig. 2 is a view similar to Fig. 1 showing another step in the forming of a joint;

Fig. 3 is a view similar to Fig. 2 showing the completed joint; and,

Fig. 4 is a fragmentary longitudinal section through a modified form of pipe.

This invention is a division of my prior application Serial No. 698,814, filed November 20, 1933, now Patent No. 1,973,967.

Referring to the drawing by reference characters I have indicated my improved concrete pipe generally at 5. As shown the pipe 5 comprises a metal reinforcing cylinder 6 embedded between an inner layer of concrete 7 and an outer layer of concrete 8. At one end of the cylinder 6 I provide a spigot ring 9 which is made of thicker metal than the cylinder and is butt welded thereto and at the opposite end of the cylinder I provide a bell ring 10 which like the spigot ring is made of thicker metal than the cylinder and is butt welded thereto. The bell ring includes an inclined shoulder 11 and an enlarged end section 12, the inside diameter of which is greater than the outside diameter of the spigot ring 9.

The end of the inner layer of concrete 7 adjacent the spigot ring 9 terminates flush with the outer end of the spigot ring as at 13 and the opposite end is set back from the outer end of the bell ring 10 and terminates in a beveled face 14 the outer edge of which engages the inner end of the tapered shoulder 11 of the bell ring. The end of the outer layer of concrete adjacent the spigot ring is set back from the outer end of the spigot ring as at 15 and the opposite end terminates flush with the outer end of the bell ring as at 16.

When the two lengths of the pipe 5 are to be joined the spigot ring 9 of one pipe is positioned in the bell ring 10 of the other pipe and the two pipes moved together until the end 16 of the outer layer of concrete of one pipe engages the end 15 of the outer layer of concrete of the other pipe. In this position a chamber 17 is formed between the bell and spigot rings and a chamber 18 is formed between the adjacent ends 13 and 14 of the inner layers of concrete.

When the lengths are thus joined an annular rope member 19 which is made of lead or is a steel cable is driven into the chamber 17 until it engages the face 15 as shown in Fig. 2. A caulking material 20 such as lead is then driven in the chamber 17 between the rope 19 and the outer end of the spigot ring 9 as shown in Fig. 3. Thereafter a fill material 21, such as cement mortar, is positioned in the chamber 18.

In Fig. 4 I have indicated a modified form of concrete pipe generally at 22. As shown the pipe 22 is similar in most respects to the pipe 5 and like portions thereof are indicated by similarly primed reference characters. In the pipe 22 I may arrange a ring or band 22' which extends about each spigot ring 9' and is secured thereto as by welding. This ring 22' preferably has an outside diameter which is not greater than the inside diameter of the bell ring 12'. Also in this type I may employ a solid metal band 23' which is positioned on the spigot 9' adjacent the face 15' of the outer layer of concrete before two sections of the pipe are joined. As shown the band 23' is circular in cross section and is spot welded to the spigot ring but it may be of any cross sectional configuration desired and may be positioned on the spigot ring without securing it thereto. The outer diameter of the band 23' is slightly less than the inside diameter of the bell ring section 12' so that when two sections of the pipe are joined the band 23' will telescope within the bell ring. After the pipes are thus joined the caulking material 20' is driven into the chamber 17' between the band 23' and the outer end of the spigot ring and then the fill material 21' is positioned in the chamber 9'. It will be understood that either the ring 22' or the band 23' may be used or omitted depending on the requirements in each installation.

From the foregoing description it will be apparent that I have provided a novel concrete pipe construction and joint for connecting two lengths of the pipe which is simple in construction and highly efficient in use.

Having thus described my invention I claim:

1. A conduit comprising a plurality of lengths of concrete pipe laid end to end, each of said lengths including a bell section at one end and a reduced spigot section at the opposite end, an annular bend of rigid material rectangular in cross section and positioned on each of said spigot sections and spaced from the outer ends thereof, said band having one face engaging the spigot member and having two faces engaged by the concrete and having one face exposed, said pipes being laid with said spigot sections telescoping in said bell sections and with said bands telescoped in said bell sections, and a caulking material positioned in the space between adjacent bell and spigot sections and engaging said band.

2. In combination with a plurality of lengths of concrete pipe laid end to end, each of said pipes including a bell section at one end and a reduced spigot section at the opposite end, each of said bell sections having a metal lining therein and each of said spigot sections having a metal band thereon, said lengths being laid with said spigot sections telescoped in said bell sections and with said bell sections positioned in said recesses formed by said collars, a rigid annular metal band positioned on each of said spigot bands and spaced from the outer ends of said spigot bands, said metal band being embedded in the concrete, a second band on said spigot end and disposed adjacent said first band and a caulking material positioned in the space between adjacent bell and spigot sections.

BOZIDAR J. UKROPINA.